United States Patent Office 3,484,407
Patented Dec. 16, 1969

3,484,407
LINEAR CONDENSATION POLYMERS CONTAINING CARBONAMIDE AND HETEROCYCLIC LINKAGES
Jack Preston, Raleigh, N.C., assignor to Monsanto Company, St. Louis, Mo., a corporation of Delaware
No Drawing. Continuation-in-part of application Ser. No. 347,360, Feb. 26, 1964. This application Jan. 13, 1967, Ser. No. 609,010
Int. Cl. C08g 20/20
U.S. Cl. 260—47    10 Claims

ABSTRACT OF THE DISCLOSURE

High temperature resistant linear condensation polymers with regularly recurring structural units containing amide linkages and heterocyclic linkages alternating with aromatic nuclei are described with methods of preparation. These polymers are useful in the preparation of fibers and films having high temperature resistance and retention of strength on prolonged exposure to degradative conditions.

CROSS-REFERENCE TO RELATED APPLICATIONS

This application is a continuation-in-part of application Ser. No. 347,360, filed Feb. 26, 1964, now abandoned.

BACKGROUND OF THE INVENTION

Synthetic linear condensation polymers such as polyamides in the form of fibers, filaments, films and other shaped articles have found wide application in textile and other industrial end uses requiring high tensile strength, abrasion resistance, and resistance to thermal and other degradative conditions. Subsequent searching for polymers of improved thermal resistance has produced various heterocycle polymers such as polyoxadiazoles, polybenzimidazoles and polyimides. Typical of such polymers are those in U.S. Patents 2,895,948, 2,904,537 and 3,044,994. Such heterocycle polymers have certain characteristics including heat resistance and resistance to acids and other degradative conditions, which are superior to those of polyamides in general. Wholly aromatic polyamides such as those of U.S. 3,006,899 and 3,049,518 have also been found to be highly resistant to high temperatures. This invention presents polymers which combine the desirable qualities and characteristics of both aromatic polyamides and heterocycle polymers.

SUMMARY OF THE INVENTION

Accordingly, it is an object of this invention to provide new compositions of matter and a process for their preparation.

Another object of this invention is the provision of novel amide-heterocycle polymers which are characterized by the fact that they have amide and at least two heterocyclic linkages in each repeating unit which appear in a perfectly regular sequence along the polymer chain, each amide and each heterocyclic linkage being separated by an aromatic nucleus, the polymers further being characterized by the fact that there is at least one point in each repeating unit of the polymer through which a plane of symmetry can be drawn.

It is a further object to provide polymers which are unusually thermally stable.

An additional object of the invention is the provision of fibers, filament, films and other shaped articles prepared from the amide-heterocycle polymers of this invention.

Other objects and advantages will become apparent from the description of the invention which follows hereinafter.

This invention is concerned with the provision and preparation of "symmetrical" amide-heterocycle polymers having the formula

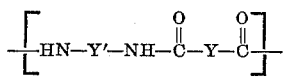

wherein Y and Y' are selected from Ar and

Ar—X—Ar'—X—Ar where Ar and Ar' are aromatic divalent or multivalent radicals having a single, multiple or fused structure, and X represents a 5 or 6 ring member heterocyclic linkage which contains from two to three hetero elements such as N, S, P, As, O and Se. In the general formula Y and Y' may be the same or different provided that there is at least one Ar—X—Ar'—X—Ar linkage in each repeating unit. In each Ar—X—Ar'—X—Ar linkage the central aromatic radical, Ar', may have a different orientation from the two outer Ar radicals which must both have the same orientation. The heterocyclic linkage X may be symmetrical or unsymmetrical. If X is unsymmetrical, however, it should be placed about Ar' in such a manner as to preserve the symmetry of Ar—X—Ar'—X—Ar, i.e., it should be possible to place a plane of symmetry through Ar' in such a way that a pair of mirror images are produced.

DETAILED DESCRIPTION AND PREFERRED EMBODIMENTS

The heterocyclic linkages are taken from

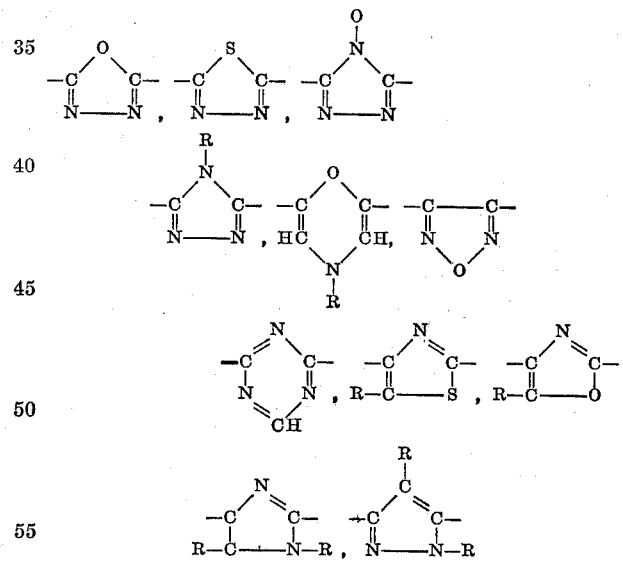

and the like, where R=H or lower alkyl.

In some cases it may be desirable to fuse X to Ar or Ar' as in benzimidazole, benzothiazole, and benzoxazole. Examples of this type will be shown in the illustrations of polymers.

The divalent aromatic radicals may be, for example,

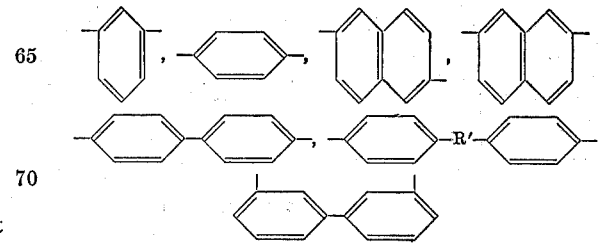

wherein R' is —O—, —S—, —SO₂—, and similar aromatic radicals.

The use of the term "symmetrical" herein is intended to relate to a characteristic of the polymers of this invention which may be described by the fact that there is at least one point in each repeating unit of the polymers through which a plane of symmetry can be drawn. For example, a repeating unit may be shown as follows:

wherein a plane of symmetry as indicated by the dotted line shows that the repeating unit consists of two halves which are mirror images of each other.

As examples of the polymers of this invention which are embraced by the general formula as previously shown there may be mentioned:

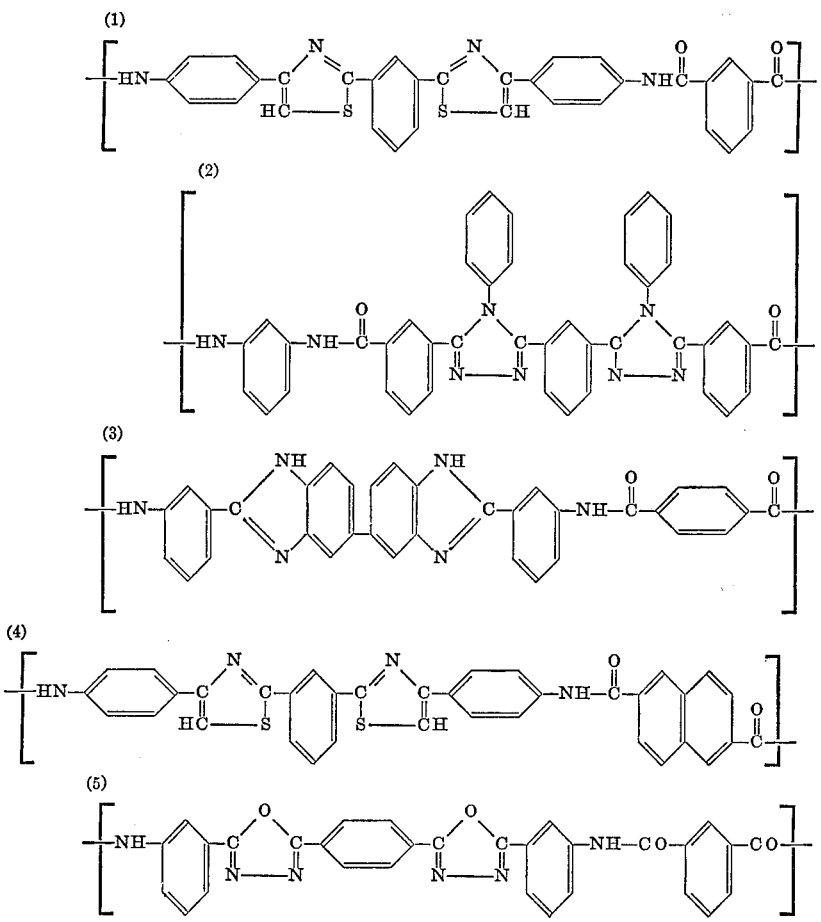

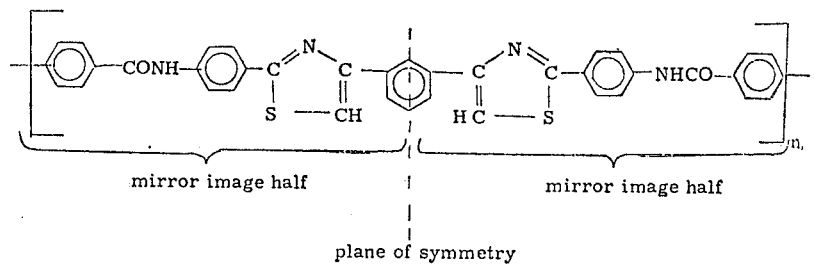

and

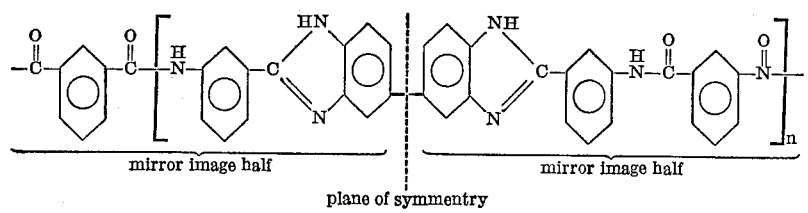

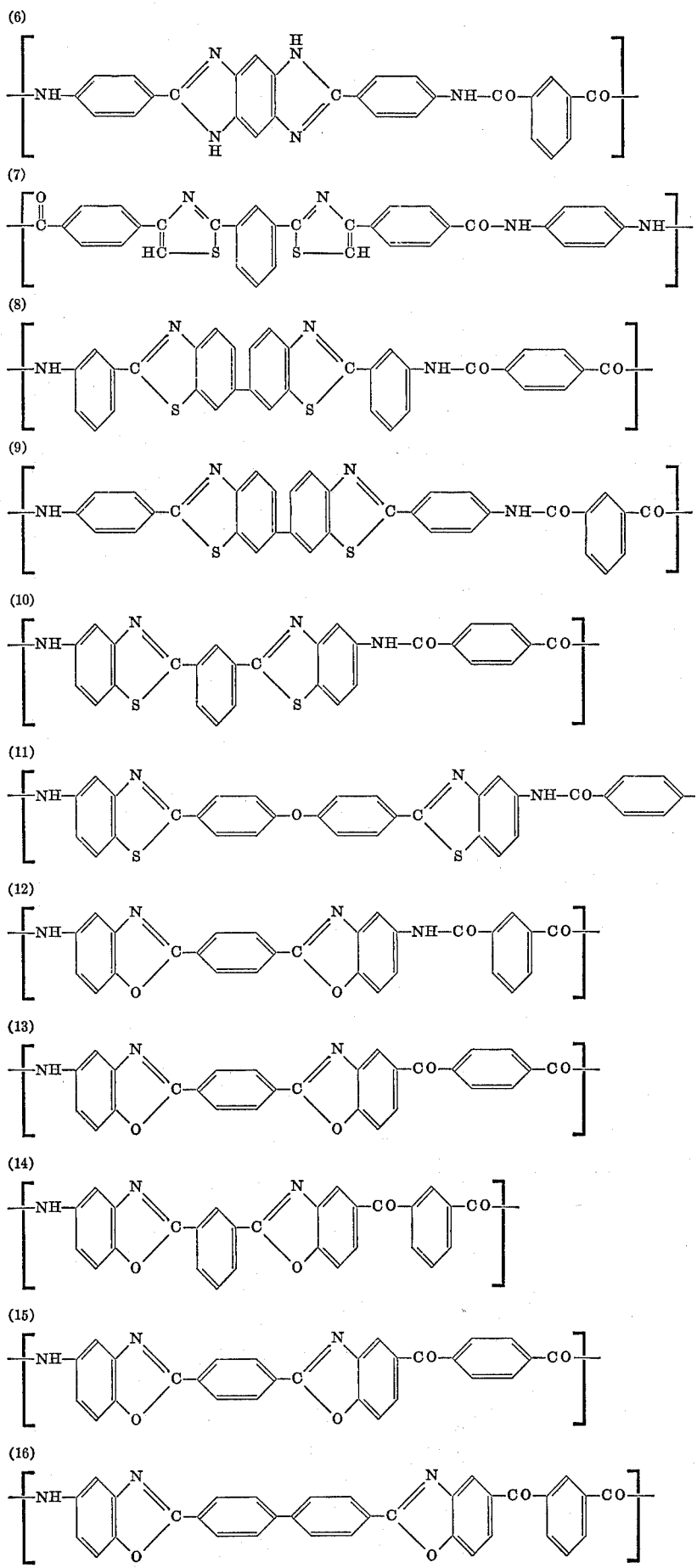

(17)
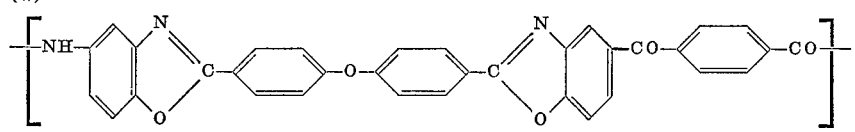
(18)
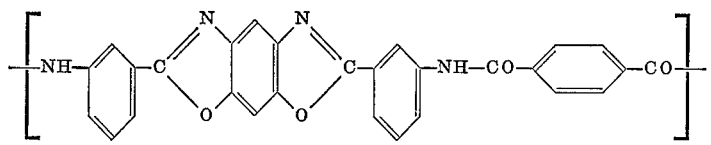
(19)
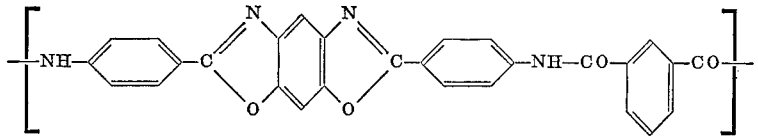
(20)
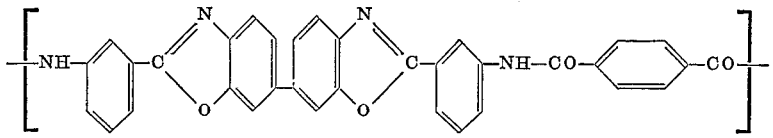
(21)
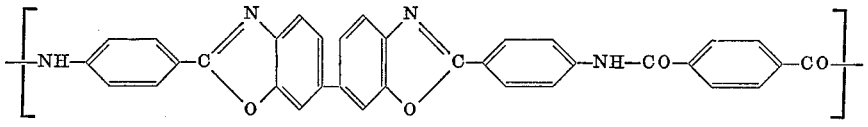
(22)
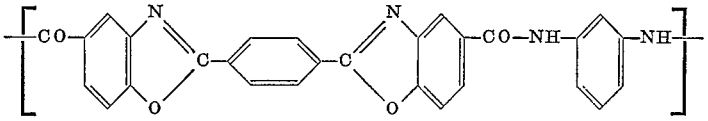
(23)
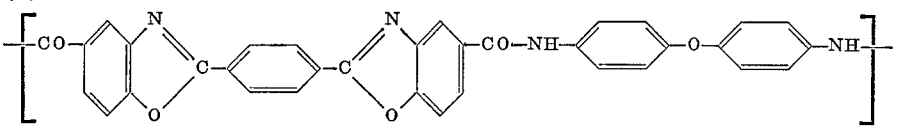
(24)
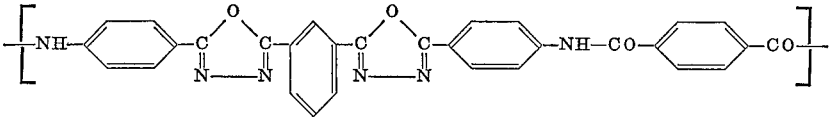
(25)
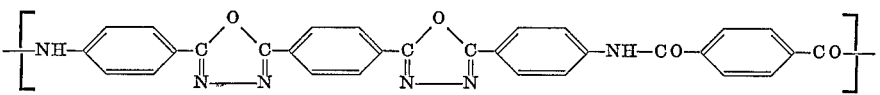
(26)
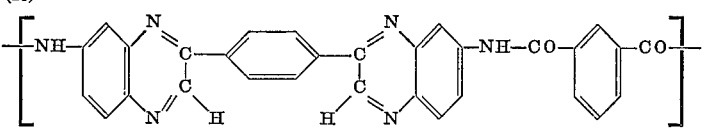
(27)
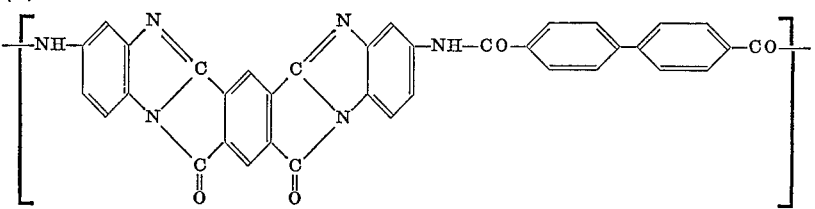

The polymers of this invention may be prepared by reacting together two monomers, each containing functional groups which react with the functional groups of the other to produce a polymer containing amide and two or four heterocyclic linkages in each repeating unit which appear in a perfectly regular sequence along the polymer chain. Thus, the polymers may be prepared via the reaction of an aromatic diacid chloride with an aromatic diamine containing two heterocyclic linkages (or precursors thereto) separated by an aromatic linkage or from the reaction of an aromatic diacid chloride containing two heterocyclic linkages (or precursors thereto) separated by an aromatic linkage with an aromatic diamine. An alternate route to the polymers of this invention employs the reaction of a monomer containing preformed amide linkages and functional groups which, when reacted with the functional groups of a second monomer, produce heterocyclic linkages. The polymerization of the reactants is a condensation reaction which may be conveniently conducted by interfacial or solution polymerization methods, by heating of stoichiometric amounts of the reactants and the like.

The following equations are exemplary of how the polymers of the invention can be prepared:

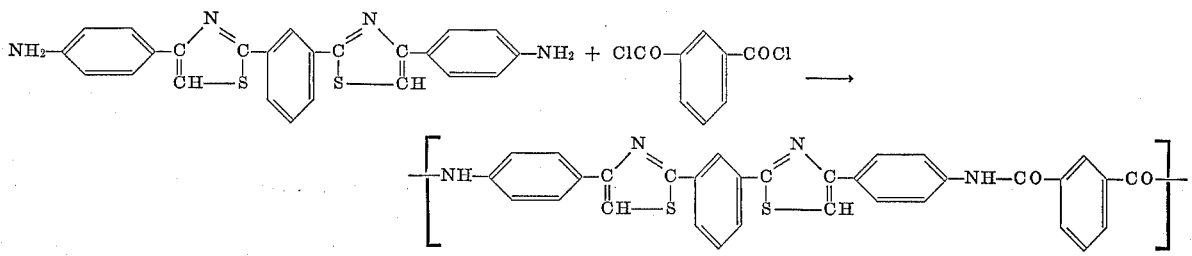

Of the several routes to the preparations of the polymers of this invention, the polymerization of an aromatic diamine containing two heterocyclic linkages joined by an aromatic linkages may be cited as illustrative.

As examples of the diamines which may be used in the practice of this invention, the following are representative.

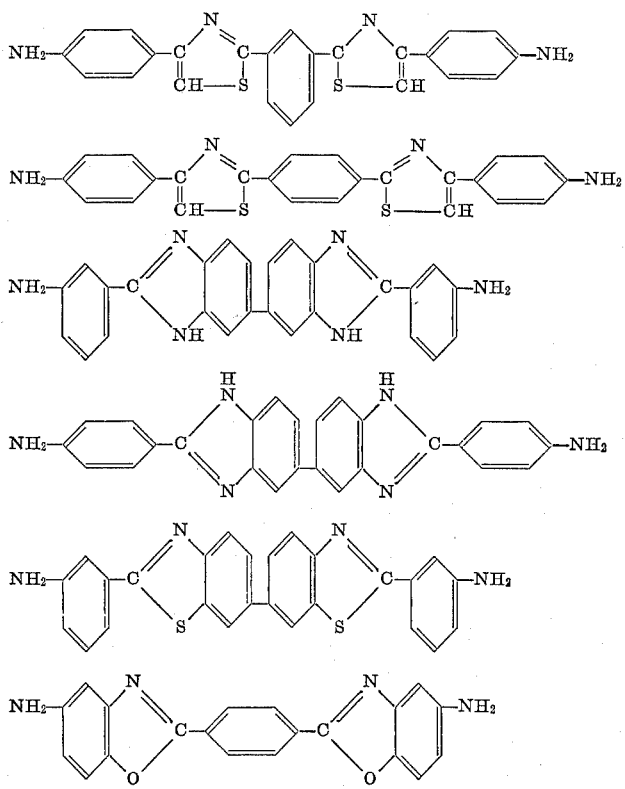

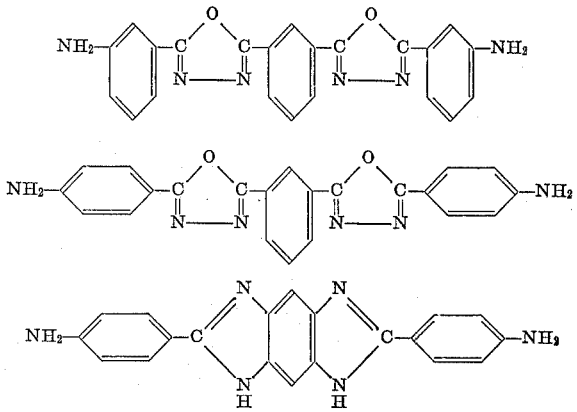

The method of preparation of the diamines of this invention, in general follows prior art practices. Additional methods are disclosed in the examples. Conveniently, it involves the preparation of a dinitro intermediate which is then reduced to the diamine compound containing heterocyclic linkages or containing linkages which are precursors to the desired heterocyclic linkages.

The dinitro intermediate may be prepared by any of several well known methods. A 1,3,4-oxadiazole linkage may be formed from a hydrazide linkage which may be formed in solution or via a Schotten-Baumann reaction.

The Schotten-Baumann or interfacial type reaction involves the use of a nitro-aromatic acid chloride either alone or in a suitable solvent which will dissolve the acid chloride and which will at the same time not adversely affect the other component which is dissolved or dispersed in water. Suitable solvents include chloroform, tetrahydrofuran, benzene, benzonitrile, acetophenone, acetonitrile, dimethylacetamide, and other solvents-tetrahydrofuran being preferred. The reaction mixture is then stirred rapidly until the reaction is completed and the dinitro compound is filtered from the reaction mixture. The choice of intermediate reactants will, or course, depend upon the type of heterocyclic linkage desired. For example, the reaction of m-nitrobenzoyl chloride plus hydrazine in a basic reaction media will produce a nitro hydrazide intermediate which may then be converted by a dehydrating agent, such as phosphorousoxychloride, thionyl chloride, or acetic anhydride, to a dinitro intermediate compound containing a 1,3,4-oxadiazole linkage. The hydrazide intermediate may also be produced in a solvent, such as dimethylacetamide. The dinitro compound containing the oxadiazole linkage may then be reduced to the diamino compound.

It is also possible to prepare the dinitro hetero-containing intermediate in a one-step synthesis. For example, the reaction of N-phenyl-m-aminobenzimide chloride and m-nitrobenzoyl hydrazide yields the dinitro intermediate containing a 1,3,4-triazole linkage directly. The reaction of a phenacyl halide with a thioamide conveniently produces the thiazole linkage; the reaction of an acid group (or derivative) with o-diamine groups conveniently produces benzimidazole linkages.

Other heterocyclic linkages may be preformed readily in the compositions of this invention. Such heterocyclic linkages include: 1,3,4-thiodiazole, thiazole, benzimidazole, imidazole, etc.

The reduction of the dinitro intermediate to the amine may be effected by use of catalytic reducing methods such as those involving the use of a palladium on charcoal catalyst typically employing 5 percent palladium on charcoal, a Parr hydrogenation unit or other unit. The reduction may also employ Raney nickel, cobalt and other similar heavy metal catalysts, these catalyst systems usually being effected in an alcohol or in solution in dimethylformamide or similar compounds. Reduction may also be accomplished using chemical reduction methods, such as stannous chloride and hydrochloric acid, iron and sulfuric acid, polysulfide solutions and the like.

Suitable dicarboxylic acids or diacid derivatives which may be used in the practice of the invention include all diacid compounds where the carbonyl radicals are joined by aromatic or heterocyclic aromatic linkages, for example, aromatic diacid halides, such as isophthaloyl halide and substituted isophthaloyl chlorides such as alkyl, aryl, alkoxy, nitro and other similar isopthaloyl chlorides and isophthaloyl bromides. Examples of such compounds include 4,6-dimethyl-5-propyl isophthaloyl chloride, 2,5-dimethyl isophthaloyl chloride, 2,5-dimethoxy, isophthaloyl chloride, 2,5-diethoxy isophthaloyl chloride, 5-propoxy isophthaloyl chloride, 5-phenyl isophthaloyl chloride, 2-methyl-5-phenyl isophthaloyl chloride, 2,5-dinitro isophthaloyl chloride, 5-nitro isophthaloyl chloride and the like. Terephthaloyl chloride or terephthaloyl bromide may also be used and may be substituted in the manner described above for isophthaloyl chloride. Examples of terephthaloyl chlorides include 2,6-dimethyl terephthaloyl chloride, tetramethyl terephthaloyl chloride, 2-methoxy terephthaloyl chloride, 2-nitro terephthaloyl chloride and the like.

These diacid monomers may be prepared by any of the well known prior art methods used to prepare aromatic diacid compounds. For example, oxidation of xylenes.

The polymers of the invention may be obtained by any of the well known condensation polymerization techniques such as solid state, melt, interfacial or solution polymerization techniques.

The solution polymerization method generally involves dissolving the diamine in a suitable solvent which is inert to the polymerization reaction. Among such solvents there may be mentioned dimethylacetamide, 1-methyl-2-pyrrolidone, 1,5-dimethyl-2-pyrrolidone and the like. These solvents are rendered more effective in many instances by mixing them with a small amount, up to 10 percent, of an alkali or alkaline earth salt such as lithium chloride, lithium bromide, magnesium bromide, magnesium chloride, beryllium chloride, or calcium chloride. The preferred solvent for solution polymerization is dimethylacetamide or dimethylacetamide containing a small amount of dissolved lithium chloride. The diamine solution is cooled to between 20 and −30° C. and the dicarbonyl monomer is added either as a solid or in a solution of one of the aforementioned solvents. The mixture is then stirred for a period of time until polymerization is substantially complete and high viscosity is attained. This highly viscous solution may be spun per se or the polymer may be isolated by pouring the mixture into a nonsolvent, washing and drying the polymer and then preparing the spinning solution.

The interfacial polymerization reaction is conducted by mixing water, an emulsifier and the diamine which may be in the form of its dihydrochloride. A proton acceptor is then added and the mixture is then stirred rapidly. During this rapid stirring a solution of the dicarbonyl monomer in an inert organic solvent is added, the mixture is stirred until polymerization is complete, the polymer is then isolated by filtration and is washed and dried. The dicarbonyl monomer solvent may be any convenient solvent such as cyclic non-aromatic oxygenated organic solvent such as a cyclic tetramethylene sulfone, 2,4-dimethyl cyclic tetramethylene sulfone, tetrahydrofuran, propylene oxide and cyclohexanone. Other suitable dicarbonyl monomer solvents include chlorinated hydrocarbon such as methylene chloride, chloroform and chlorobenzene, benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

The amounts of the various reactants which may be employed will, of course, vary according to the type of polymer desired. However, in most instances, substantially equimolar quantities or a slight excess of diamine to dicarbonyl may be used. For interfacial polymerization reactions, sufficient proton acceptor to keep the acidic by-products neutralized may be added, the exact amount easily determined by one skilled in the art.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like.

A proton acceptor as the term is employed herein indicates a compound which acts as an acid scavenger to neutralize HCl, formed during the reaction, and which aids to carry the reaction to completion. Suitable proton acceptors include sodium carbonate, magnesium carbonate, calcium carbonate, tertiary amines, such as triethyl amine, trimethyl amine, tripropyl amine, ethyl dimethyl amine, tributyl amine and similar compounds which react as desired.

The products of this invention are useful in a wide range of textile and other industrial applications. In the form of fibers, filaments and films the polymers of this invention are thermally resistant as well as being resistant to acids and other types of chemical degradation. Films of these polymers are useful as protective covering agents in areas where exposure to corrosive conditions is encountered.

The invention is further illustrated by the following examples in which all parts and percents are by weight unless otherwise indicated. Heat resistant properties of the polymers of the invention were tested by differential thermal analysis (DTA) and thermogravimetric analysis (TGA). Inherent viscosity values are determined at 30° C. in dimethylacetamide (DMAc) containing 5 percent dissolved lithium chloride, using a concentration of 0.5 g. of polymer per 100 ml. of solvent. Fibers were characterized in general by having good strength retention above 300° C.

EXAMPLE I

Polymers of m-bis(4-p-aminophenylthiazol-2-yl)benzene

Polymers of this example have the following structure:

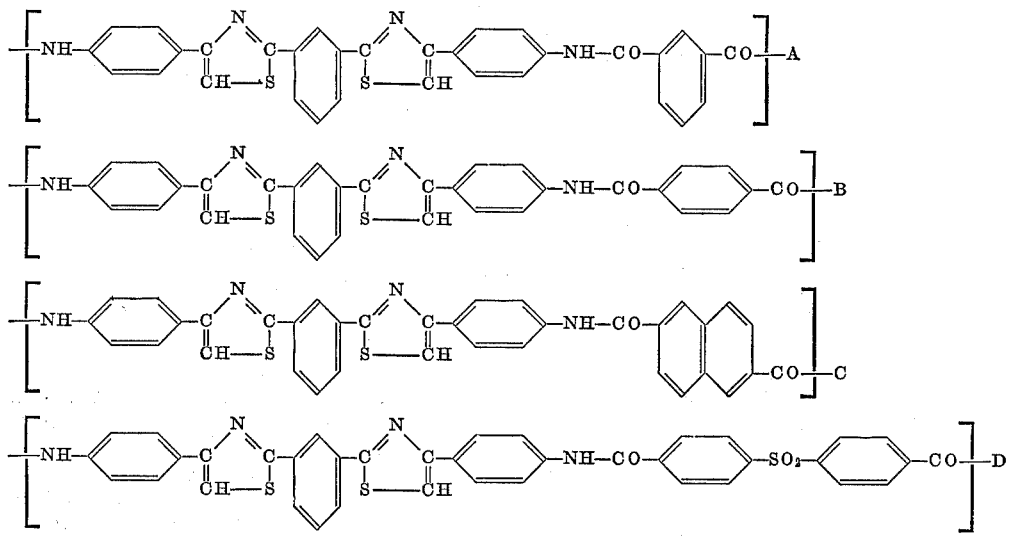

The preparation of the diamine, m-bis(4-p-aminophenylthiazol-2-yl)benzene diamine A', can readily be carried out by catalytically reducing the corresponding dinitro intermediate formed by the reaction of 225 g. of p-nitrophenacyl bromide in 250 ml. dimethacetamide (DMAc) with 94.4 g. of dithioisophthalamide in 320 ml. of dimethylacetamide (DMAc). The dinitro product separated from solution upon cooling; two recrystallizations from 1.5 liters of DMAc afford 151 g. (65% yield) of pure product, M.P. 271–272° C. The diamine A obtained by reduction of the above dinitro intermediate using Raney nickel catalyst in DMAc has a M.P. of 230–232° C.

(A) *Isophthalamide.*—A solution of 8.60 g. (0.02 mole) diamine A' in 65 ml. DMAc containing 5 percent dissolved lithium chloride was cooled to −30° C. and times at 310° C. and redrawn 1.2× at 450° C. Fiber properties were:

Denier _____d.p.f__ 3.47
Tenacity (70° F.) _____g.p.f__ 3.38
Elongation _____percent__ 12.8
Initial modulus _____g.p.d__ 88

| | | |
|---|---|---|
| Tenacity at 200° C | 2.05 g.p.d | 13.5% elong. |
| Tenacity at 300° C | 1.56 g.p.d | 26.6% elong. |
| Tenacity at 350° C | 0.97 g.p.d | 24.1% elong. |
| Tenacity at 400° C | 0.66 g.p.d | 15.9% elong. |
| Tenacity at 450° C | 0.61 g.p.d | 10.9% elong. |
| Tenacity at 520° C | Fails to support 0.1 g. load per den. | |

The fibers showed little loss in weight (TGA) to 450° C. and retained 85 percent of their weight at 500° C. A second lot of polymer of inherent viscosity 1.58 was wet spun to fiber. Fiber properties were:

Denier _____d.p.f__ 6.3
Tenacity (70° F.) _____g.p.d__ 4.8
Elongation _____percent__ 11.7
Initial modulus _____g.p.d__ 124

The polymer of section A above was also prepared via a procedure in which condensation of a dithioamide monomer and a bischloroacetophenone gave a polymer containing thiazole linkages and amide linkages, the latter having been preformed in the bischloroacetophenone monomer.

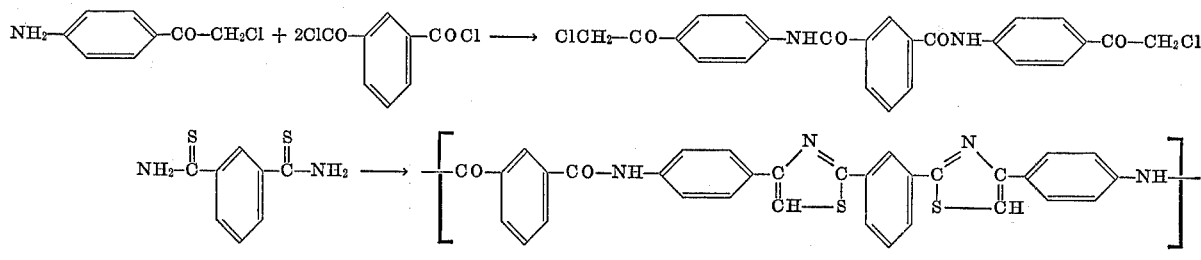

4.06 g. (0.02 mole) isophthaloyl chloride added. The viscous solution was stirred 15 minutes at −30° C., then was allowed to warm to 0° C. and was stirred for 15 minutes. Next, the viscous solution was allowed to warm to room temperature and was stirred for three hours before neutralization with a slurry of lithium hydroxide (0.04 mole monohydrate heated to 130° C.) in 10 ml. DMAc. A yield of 11.1 g. of dried polymer, A, was obtained after coagulation of above solution in water followed by washing and drying of the polymer.

Polymer of inherent viscosity 1.2 prepared in the above manner was dry-spun from a solution of 34 g. polymer in 80 ml. DMAc containing 5 percent dissolved lithium chloride. The fiber was soaked in water, dried, drawn 2.6

To a suspension of 18.7 g. (0.1 mole) 4'-amino-2-chloroacetophenone in 200 ml. ice water contained in a Blendor jar was added a solution of 10.2 g. (0.05 mole) isophthaloyl chloride in 40 ml. tetrahydrofuran, Next, 4.0 g. sodium hydroxide was added, and the mixture was stirred 20 minutes; the product was then filtered, washed in water, and dried to yield 11.3 g. N,N'-bis(4-chloroacetophenone) isophthalamide.

To a solution of 2.32 g. of the above material in 15 ml. DMAc containing 3 percent dissolved lithium chloride was added 1.48 g. isophthaldithioamide (M.P. 212–213° C.). A film was cast from the resulting solution.

(B) *Terephthalamide.*—Example I(A) was repeated using terephthaloyl chloride. However, a paste of polymer and solvent was obtained. The dried polymer, B, was somewhat soluble in DMAc containing 7 percent dissolved lithium chloride; surprisingly, the polymer precipitated when the solution was heated but redissolved upon cooling.

(C) *2,6 - Naphthalenedicarbonamide.*—A solution of 2.13 g. (0.005 mole) diamine A' in 20 ml. DMAc containing 5 percent dissolved lithium chloride was cooled to —30° C. and 1.26 g. (0.005 mole) 2,6-naphthalenedicarbonyl chloride was added. The viscous solution was stirred 15 minutes at —30° C., 15 minutes at 0° C., then two hours at room temperatures. Tough films were cast from the neutralized (lithium hydroxide) solution of C; these films showed excellent thermal resistance.

(D) *4,4'-Sulfonebibenzamide.*—A solution of 0.43 g. (0.001 mole) diamine A' in 5 m. DMAc containing 5 percent dissolved lithium chloride was cooled to —30° C. and 0.34 g. (0.001 mole) 4,4'-sulfonebibenzoyl chloride was added. The solution was stirred 15 minutes at —30° C., 15 minutes at 0° C., and an hour at room temperature. The solution of polymer D was neutralized with lithium hydroxide, then poured into water. The polymer was isolated, dried, redissolved in DMAc containing 5 percent dissolved lithium chloride, and cast into film of high thermal stability.

EXAMPLE II

Polyisophthalamide of p-bis(4-p-aminophenylthiazol-2-yl)benzene

This example shows the preparation of polymer of the following structure:

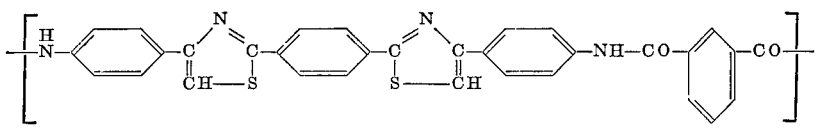

The diamine employed in this example was prepared by the same method used to prepare the diamine of Example I except that terephthaloyldithioamide was used in place of isophthaloyldithioamide. The M.P. of the dinitro intermediate was 339–341° C.; the M.P. of the diamine, obtained by reduction, was 280–282° C.

A solution of 0.426 g. (0.001 mole) p-bis(4-p-aminophenylthiazol-2-yl)benzene, described above, in 5 ml. of DMAc containing 6 percent dissolved lithium chloride was cooled to —30° C. and 0.203 g. (0.001 mole) isophthaloyl chloride was added. The mixture was stirred 15 minutes at —30° C., then warmed to 0° C., held at 0° C. 15 minutes, then stirred an hour at room temperature. An equivalent of lithium hydroxide was used to neutralize the dope, which was then cast into film.

EXAMPLE III

Polymers of 2,2'-bis(m-aminophenyl)-5,5'-bibenzimidazole

Polymers of 2,2'-bis(m-aminophenyl)-5,5'-bibenzimidazole, diamine B', are illustrated by the following structures:

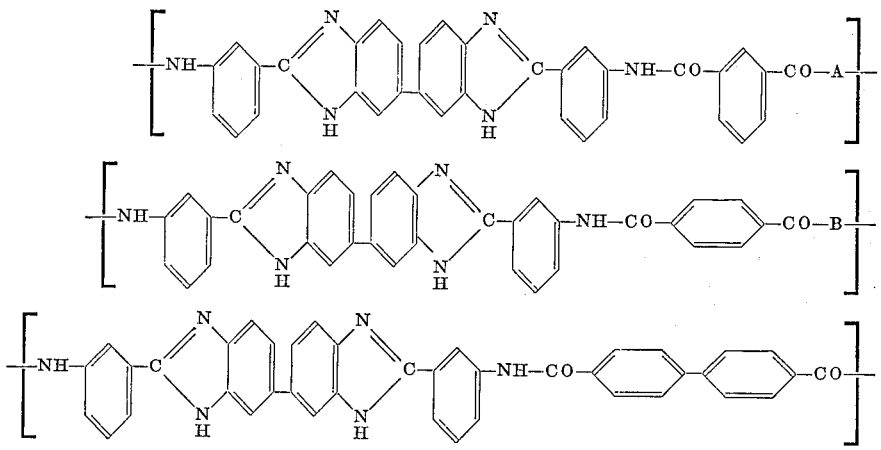

The diamine B', used in this example was prepared by the reaction of m-aminobenzoic acid with 3,3'-diaminobenzidine in hot polyphosphoric acid (PPA). In a typical preparation, a mixture of 10.7 g. of 3,3'-diaminobenzidine recrystallized m-aminobenzoic acid and 150 ml. of PPA was stirred and heated at 220° C. for 3.5 hrs. under a nitrogen atmosphere. The solution was cooled and poured into water and stirred rapidly in a Blendor jar; the product was collected on a filter, then soaked in 10% sodium carbonate solution overnight. The crude product, after washing and drying, had a M.P. of 292–300° C. Recrystallization from ethanol afforded 15 g. of material, M.P. 306–309° C.; the sublimed product, free of ethanol of crystallization, had a M.P. of 297–299° C.

(A) *Isophthalamide.*—A solution of 2.08 g. (0.005 mole) diamine B' in 20 ml. DMAc containing 5 percent dissolved lithium chloride was cooled to —30° C. and 1.02 g. (0.005 mole) isophthaloyl chloride added. The viscous solution was stirred 15 minutes at —30° C., 15 minutes at 0° C., and two hours at room temperature. The solution was neutralized by addition of a slurry of 0.25 g. lithium hydroxide and 10 ml. DMAc. Films cast from the above solution were very strong and tough; good thermal resistance was exhibited to ca. 400° C.

(B) *Terephthalamide.*—Example III(A) was repeated using terephthaloyl chloride instead of isophthaloyl chloride. Film cast from the neutralized solution of polymer was tough and even more thermally resistant than that described in section II. A. above.

(C) *4,4'-bibenzamide.*—Example III(A) was repeated using 1.39 g. 4,4'-dibenzoyl chloride instead of isophthaloyl chloride. Film was cast from the neutralized solution.

EXAMPLE IV

Polymers of 2,2'-bis(p-aminophenyl)-5,5'-bibenzimidazole

Polymers of 2,2' - bis(p-aminophenyl)-5,5'-bibenzimid azole, diamine C', are illustrated by the following structures:

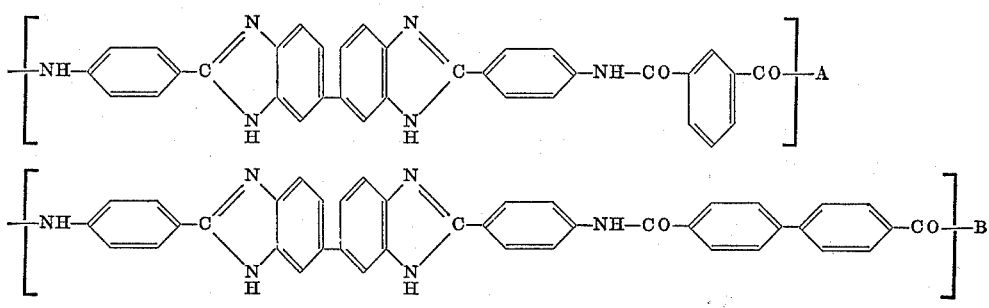

Diamine C' was prepared by the method used for diamine B', except that ethyl p-aminobenzoate was reacted with 3,3'-diaminobenzidine in PPA. The M.P. of diamine C' is 321–322° C. when it is heated at 290–300° C. under vacuum (its M.P. is 407–410° C.) when ethanol of crystallization is present.

(A) A solution of 1.04 g. (0.0025 mole) diamine C' in 10 ml. DMAc containing 6 percent dissolved lithium chloride was cooled to −30° C. and 0.51 g. (0.0025 mole) isophthaloyl chloride was added. The solution was stirred 15 minutes at −30° C., 15 minutes at 0° C., then 2 hours at room temperature. The viscous solution was neutralized with an equivalent of lithium hydroxide and films were cast 20 mils thick from the solution. The dried films were soaked in water to remove dissolved salts.

(B) The Example A, above, was repeated except that 0.69 g. (0.0025 mole) 4,4'-bibenzoyl chloride was substituted for isophthaloyl chloride. The resulting solution was exceedingly viscous and was hence diluted by the addition of another 10 ml. solvent. Tough films 20 mils thick were cast from the above solution; the films were soaked in water then dried. When heated to 425° C. in air, the film showed little decomposition even after three minutes exposure to this extreme heat.

EXAMPLE V methylacetamide (DMAc) at 0° C. with 10.15 g. (0.05 mole) isophthaloyl chloride. The reaction mixture was allowed to warm to room temperature (RT), then was stirred two hours at RT. The product was precipitated into water; a 21 g. yield of material, M.P. 317–320° C. was obtained. Recrystallization of the crude product from 110 ml. dimethylformamide (DMF) afforded 20 g. of pure product, M.P. 319–320° C.

The dinitro intermediate above was reduced in 200 ml. of DMAc using 2 g. of Raney nickel catalyst and hydrogen under pressure (290 p.s.i.). The mixture was heated to 100° C. at which time the pressure reached 345 p.s.i., then fell off as the reduction proceeded. After cooling the bomb, the filtrate was collected and the product was precipitated into 2 liters of water. A 16 g. yield of pure diamine, D, M.P. 305–306° C., was obtained.

(A) To 0.216 g. (0.005 mole) D in 3 ml. N-methylpyrrolidone (NMP) at 0° C. was added 0.102 g. (0.005 mole) isophthaloyl chloride. A good film was cast from the solution.

(B) Example V(A) was repeated using terephthaloyl chloride. The film cast from solution was heated at 140° C. for 16 hrs., then at 290° C. for 15 min. 300° C. for 30 min., 330° C. for 15 min. and finally at 350° C. for 30 min. An infrared spectra of the film indicated that the hydrazide units had been converted to 1,3,4-oxadiazole units.

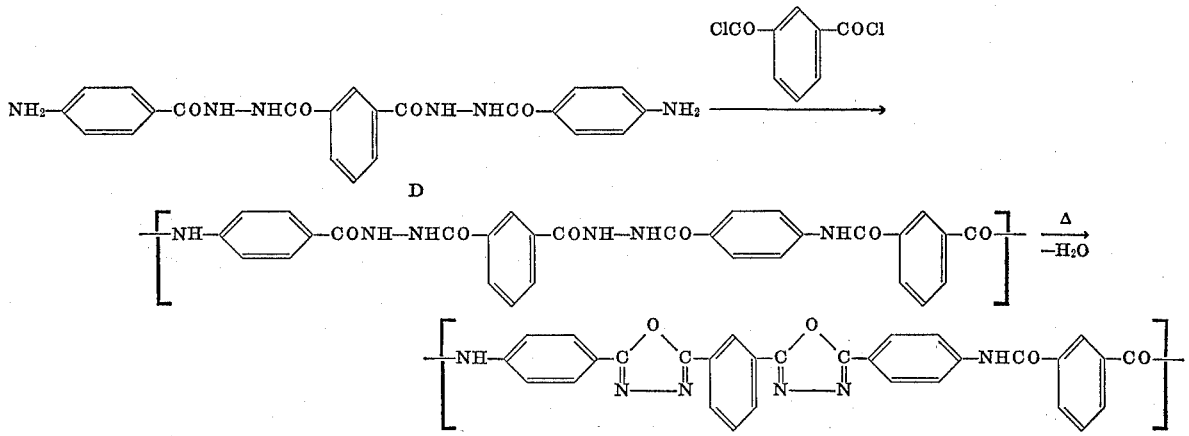

The diamine D was prepared by reduction of a dinitro intermediate which was synthesized by the reaction of 18.1 g. (0.1 mole) p-nitrobenzhydrazide in 200 ml. di- Even after 72 hrs. at 350° C. in air the film was found to be in excellent condition.

EXAMPLE VI

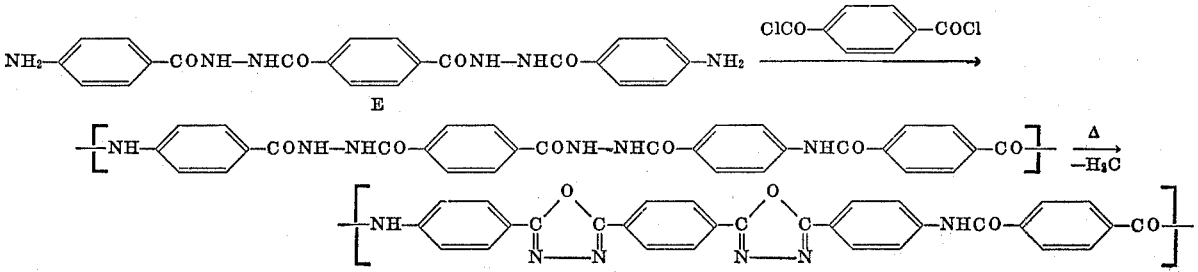

Diamine E was synthesized using the sample procedure outlined for diamine D. The dinitro intermediate corresponding to E had a M.P. of about 370–371° C. (dependent on rate of heating, 340–360 at high rate of heating); the diamine E has a M.P. of 350–352° C.

(A) To 0.216 g. (0.005 mole) diamine E in 2 ml. DMAc containing 5% dissolved lithium chloride and 1 ml. NMP at −10° C. was added 0.102 g. (0.005 mole) isophthaloyl chloride. After 10 min. the solution was allowed to warm to 0° C., then after 20 min. to RT. Good films were cast from solution.

(B) Example VI-A was repeated using terephthaloyl chloride (an additional 1 ml. of NMP added as solvent); films were cast from solution.

(C) Example VI-B was scaled up several fold using DMAc containing 5% dissolved lithium chloride as solvent and the polymer (inherent viscosity 5.50 by diluting the solution, 3.48 by redissolving precipitated polymer) was wet spun to fiber. The as-spun amidehydrazide fiber was white when washed with cold water and dried at RT under vacuum; tensile properties were: denier, 5.02 d.p.f.; tenacity, 4.37 g.p.d.; elongation, 55.9%; and initial modulus, 88 g.p.d. Fiber stretched in hot water, hot water washed and dried on hot rollers was light yellow in color, well collapsed and lustrous; tensile properties of this fiber were: denier, 4.18 d.p.f.; tenacity, 6.62 g.p.d.; elongation, 28.3%, and initial modulus, 1.49 g.p.d. Fiber which was drawn 1.25× at 300° C. had the following tensile properties: denier, 2.83 d.p.f.; tenacity, 12.0 g.p.d.; elongation, 4.2%, and initial modulus, 413 g.p.d. When the hot washed and dried (but not hot-drawn) fiber was drawn 1.47× at 300° C. the tensile properties were: denier, 2.5 d.p.f.; tenacity, 10.71 g.p.d.; elongation, 2.6%, and initial modulus, 523 g.p.d. The machine drawn fiber redrawn at 300° C. had a denier of 2.80 d.p.f., 13.65 g.p.d. tenacity, 2.8% elongation and an initial modulus of 607. One individual filament break of 15.0 g.p.d. (2.98 den.) at an elongation of 3.3% was noted.

It would appear that the hot drawn fiber is the polyamidehydrazide. This fiber nevertheless has considerable thermally resistant properties as shown by the following table:

| Temp., °C.: | Tenacity | Percent elongation | Initial modulus | Den. |
|---|---|---|---|---|
| RT | 12.5 | 4.30 | 468 | 2.79 |
| 50 | 10.9 | 3.56 | 478 | 2.86 |
| 100 | 9.09 | 3.04 | 530 | 2.71 |
| 150 | 8.49 | 3.20 | 444 | 2.86 |
| 200 | 6.03 | 3.50 | 331 | 2.81 |
| 250 | 3.88 | 10.20 | 187 | 3.01 |
| 300 | 3.59 | 2.30 | 204 | 2.80 |
| 350 | 0.51 | 0.58 | 136 | 2.86 |

The rapid decline in tensile strength and elongation between 300 and 350° C. apparently signals the onset of cyclodehydration of hydrazide groups to 1,3,4-oxadiazole groups as indicated in the section above. However, so long as the temperatures are only moderately high, little or no conversion occurs and the retention of properties are excellent. For example, the retention of sonic moduli to 150° C. is phenomenal.

| °C.: | Initial modulus at 0% relative humidity, g.p.d. |
|---|---|
| 30 | 680 |
| 50 | 657 |
| 80 | 615 |
| 110 | 574 |
| 130 | 574 |
| 150 | 510 |

Long term heat-aging in air at 300° C. produces a washing of the fiber, but this is probably due to partial oxidation as well as loss of fine structure upon slow conversion of the fiber from a polyamide-hydrazide to a polyamide-oxadiazole.

| Time, days | Average denier | Average tenacity | Average percent elongation | Average initial modulus | Highest tensile on single filaments |
|---|---|---|---|---|---|
| 1 | 2.95 | 4.87 | 2.4 | 287 | 6.15/2.4/280 |
| 3 | 3.15 | 3.27 | 1.5 | 253 | 4.12/2.0/258 |
| 6 | 3.13 | 2.25 | 1.2 | 222 | 2.90/1.3/253 |
| 9 | 3.12 | 2.34 | 1.6 | 212 | 4.64/2.5/226 |
| 15 | 3.06 | 1.87 | 1.1 | 202 | 2.58/1.3/232 |

The slight rise in tenacity after heat-aging 6–9 days probably is not an antifact but is due to formation of the amide-oxadiazole structure which then loses strength as oxidation occurs.

A differential analysis (DTA) thermogram (rate=20 oc/min. in nitrogen) of the as-spun fiber shown in exotherm to about 300° C., then an endotherm at 390° C., followed by decomposition at about 525° C.

The route described above can actually be used to prepare quantities of the polyamide-oxadiazole fiber; fiber so produced is considerably more thermally resistant than is the precursor fiber.

A repeat of the above polymerization was made yielding a polymer of inherent viscosity 2.77 (redissolving precipitated polymer); the tensile properties from this spinning trial were a virtual duplicate of the former.

EXAMPLE VII

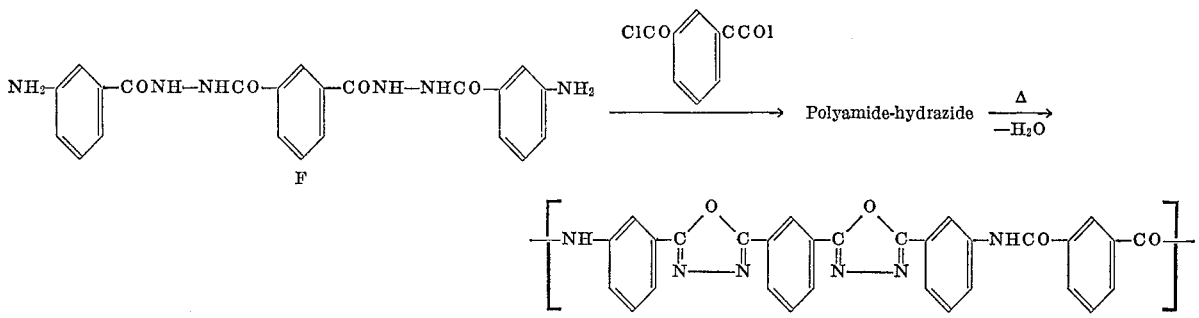

F

Diamine F was prepared using procedures described above; the dinitro intermediate to F had a M.P. of 277–279° C. while F had a M.P. of 110–112° C.

(A) To a solution of 0.216 g. (0.005 mole) diamine F in 3 ml. DMAc at 0° C. was added 0.102 g. (0.005 mole) isophthaloyl chloride; a clear film was cast from the resulting solution.

(B) Example VII-A was repeated using terephthaloyl chloride (5% dissolved lithium chloride used in solvent). A film was obtained from the solution; this film, upon slow heating 350° C., converted to a light yellow highly flexible film.

EXAMPLE VIII

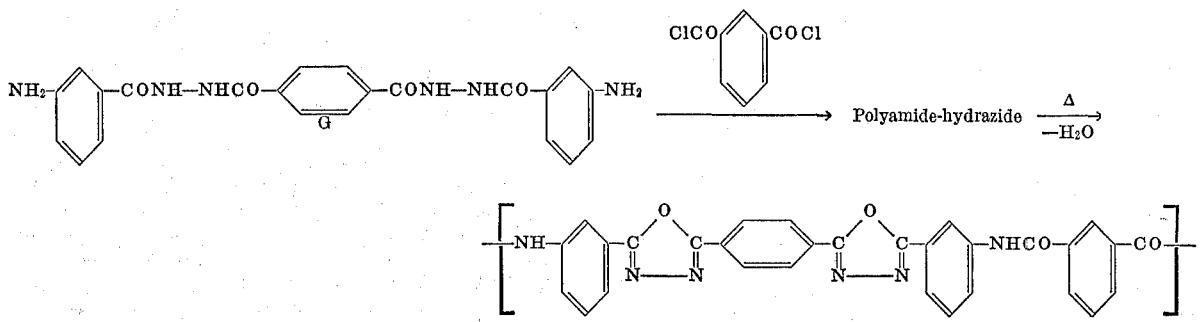

Diamine G was prepared using the procedures described above, the dinitro intermediate to G had a M.P. of 344–346° C. the diamine G had a M.P. of 300–302° C.

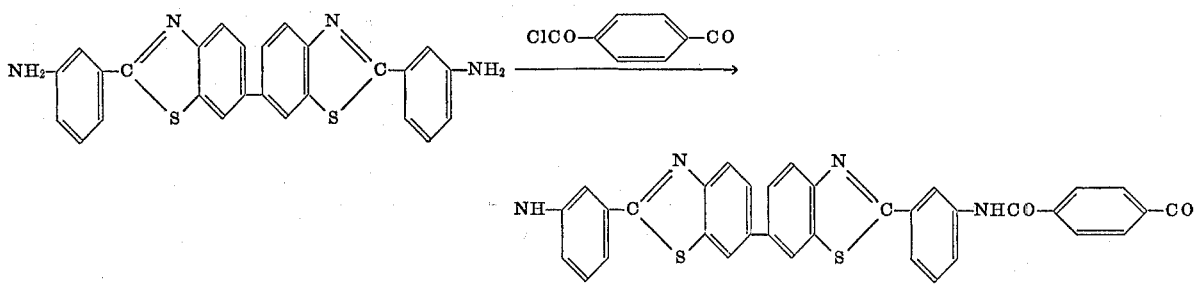

(A) The technique of Example VII–B was used to polymerize diamine E with isophthaloyl chloride. The polyamide-hydrazide had an inherent viscosity of 0.48; a film was cast from solution.

(B) To a solution of 0.216 g. (0.005 mole) diamine G in 2 ml. MNP at −10° C. was added. 1.02 g. (0.005 mole) terephthaloyl chloride. The inherent viscosity of the polymer was 1.08; a good film was cast from solution.

EXAMPLE IX

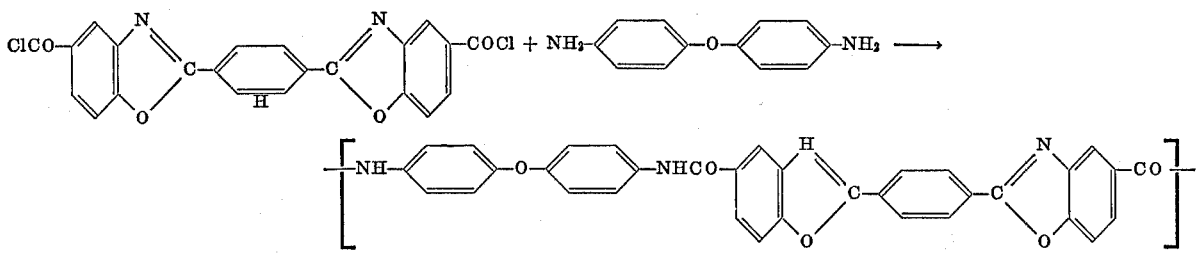

The diacid chloride H was prepared by heating a benzoxazole diacid with thionyl chloride. The diacid was prepared by heating 2 moles 4-hydroxy-3-aminobenzoic acid with one mole terephthalic acid in polyphosphoric acid at 220° C. for 2–3 hrs. and precipitating the product in water, collecting and drying.

To a solution at 0° C. of 0.200 g. (0.001 mole) bis(4-aminophenyl)ether in 5 ml. DMAc containing 5% dissolved lithium chloride was added 0.436 g. (0.001 mole) of diacid chloride H, the solution was stired at 0° C. for 4 hrs., the 3 ml. hexamethylenephosphoramide (HPT) was added. After 2 hrs. additional scouring the solution was cast to clear tough films of high termal stability.

EXAMPLE X

Diamine I was prepared by condensing two moles of m-aminobenzoic acid with 1 mole 3,3'-dimercaptobenzidine dihydrochloride in PPA at 220° C.; the solution in PPA was poured into water and I, M.P. 292–293° C., was collected.

(A) To a solution at 0° C. of 7.20 g. (0.016 mole) I in 28 ml. DMAc containing 5% dissolved lithium chloride and 42 mls. HPT was added 3.25 g. (0.016 mole) terephthaloyl chloride. The solution was spun to a light yellow colored fiber of good strength. Interestingly enough, the fiber was thermochremic, i.e., when placed in contact with a heated surface the fiber developed an intense yellow-orange color which faded when the fiber was removed from heat.

(B) The example above was repeated using isophthaloyl chloride; film was cast which could be hot drawn at 250° C. The softening or melting point of the polymer was 435° C.

EXAMPLE XI

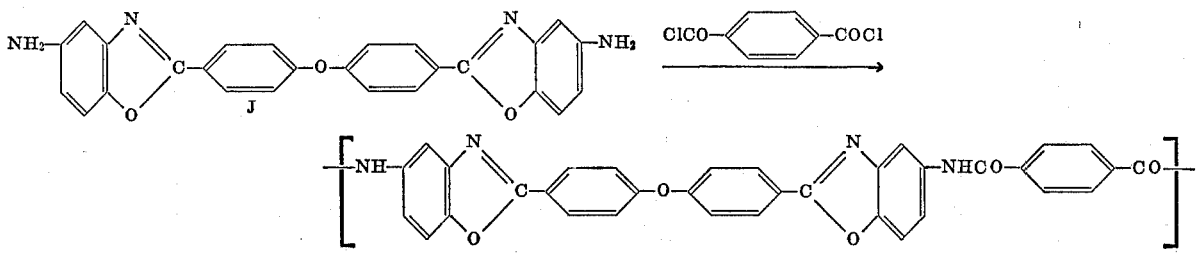

Diamine J was prepared by condensation of two moles of 2,4-diaminophenyl dihydrochloride with 1 mole, 4,4'-dicarboxyphenyl ether (ref., Brit. Pat. 835,823 (1960), assigned to ICI, Ltd.), in PPA at 220° C. as described in above procedures; the M.P. of J was 312–314° C.

(A) To a solution at 0° C. 10.85 g. (0.025 mole) J in 100 ml. HPT was added 5.08 (0.025 mole) terephthaloyl chloride; an additional 40 ml. HPT was added to the highly viscous solution. The polymer of inherent viscosity 2.69 (0.5 g./100 ml. concentrated sulfuric acid), was wet spun to lustrous fiber; surprisingly, the fiber was found to be white. The fiber as-spun had the following properties: denier, 5.28 d.p.f.; tenacity, 3.38 g.p.d.; elongation 15.1%; initial modulus, 77 g.p.d. Hot drawn fiber (300° C.) had a denier of 4.55 d.p.f., tenacity of 4.86 g.p.d., elongation of 6.1% and an initial modulus of 119 g.p.d. A sample of fiber redrawn at 325–350° C. had a denier of 4.24 d.p.f., tenacity, 5.50 g.p.d., and elongation of 5.8% and an initial modulus of 138 g.p.d.

(B) Isophthaloyl chloride was polymerized with J to yield a solution from which good films were cast.

This example illustrates the preparation of the same polymer as described in Example XII but the route of preparation does not involve a preformed heterocyclic group; the heterocycle unit is formed by a post polymerization heat treatment.

The diamine L, M.P. 280–282° C., is formed by reduction of the dinitro intermediate (M.P. 309–310° C.) formed by the reaction of equivalent quantities of 2-amino-4-nitrophenol and isophthaloyl chloride in DMAc.

Polymerization was carried out by addition at 0° C. of 0.203 g. (0.001 mole) terephthaloyl chloride to a solution of 0.378 g. (0.001 mole) of diamine L dissolved in 2 ml. NMP. The inherent viscosity of the polymer was 0.59 (at 30° C.; 0.5 g./100 ml. NMP containing 5% dissolved lithium chloride). A strong film was cast from the moderately viscous solution; heating the film at 250–300° C. in a nitrogen atmosphere converted the polyamide-phenol to the ordered benzoxazole-amide copolymer. The conversion may be carried out in air also but the film obtained are of a slightly darker color, probably due to oxidation of the pendant —OH groups.

EXAMPLE XIV

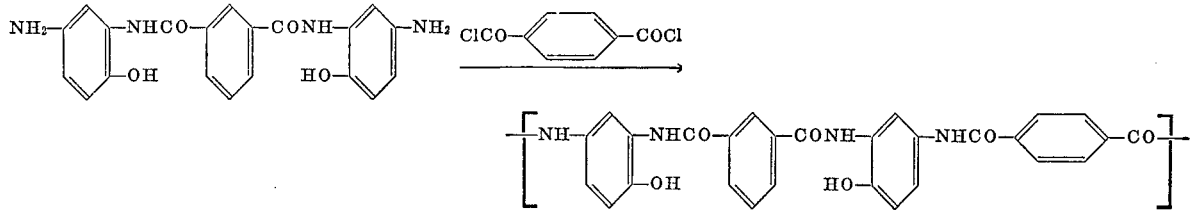

EXAMPLE XII

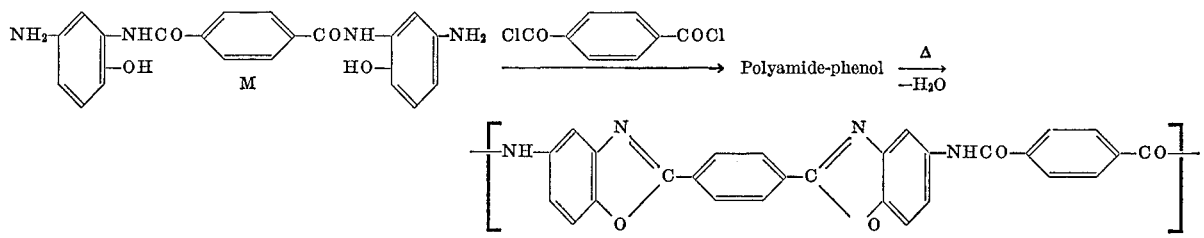

Diamine K was prepared as in Example XI except that isophthalic acid was used; the M.P. of K was 302–305° C.

To a solution of 13.68 g. (0.04 mole) K is 99 ml. HPT and 11 ml. of DMAc containing 5% dissolved lithium chloride was added 8.12 g. (0.04 mole) terephthaloyl chloride at 0° C. The solution was spun to light yellow fibers which had a denier 6.0 g. d.p.f.; a tenacity of 5.43 g.p.d.; an elongation of 6.04% and an initial modulus of 154 g.p.d. The fiber could be hot-drawn to yield a fiber having an elongation of 3.22% and an initial modulus of 198 g.p.d.

EXAMPLE XIII

This example illustrates the preparation of two polyamidebenzoxazoles which are too insoluble to prepare by use of a diamine containing preformed benzoxazole units; the amide-phenol precursor units, however, afford solubility and the benzoxazole group is readily formed by a post polymerization heat treatment.

The diamine M is prepared as in Example XIII, except that terephthaloyl chloride is used instead of isophthaloyl chloride; the M.P. of the dinitro intermediate is >450° C. while the M.P. of the diamine M is 298–300° C. (305–307° C. after drying under nitrogen at 250° C.).

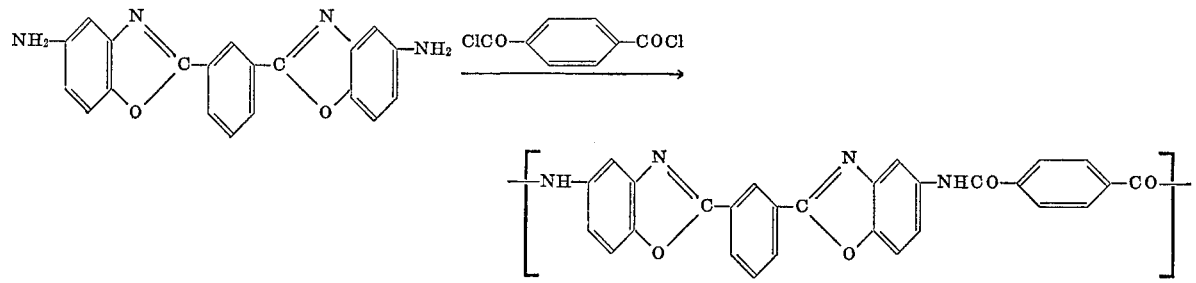

(A) Polymerization is carried out as in Example XIII. A good film was produced from the polyamide-phenol; the inherent viscosity was 1.19 (at 30° C., 0.5 g./100 ml. NMP containing 5% dissolved lithium chloride). The ordered benzoxazole-amide copolymer obtained by heating of the polyamide-phenol film in nitrogen was clear and tough.

(B) The above experiment was repeated using isophthaloyl chloride. The polyamide-phenol had an inherent viscosity of 0.56 (at 30° C., 0.5 g./100 ml. NMP containing 5% dissolved LiCl). Tough films were produced from both the polyamide-phenol and the benzoxazole-amide ordered copolymer.

EXAMPLE XV

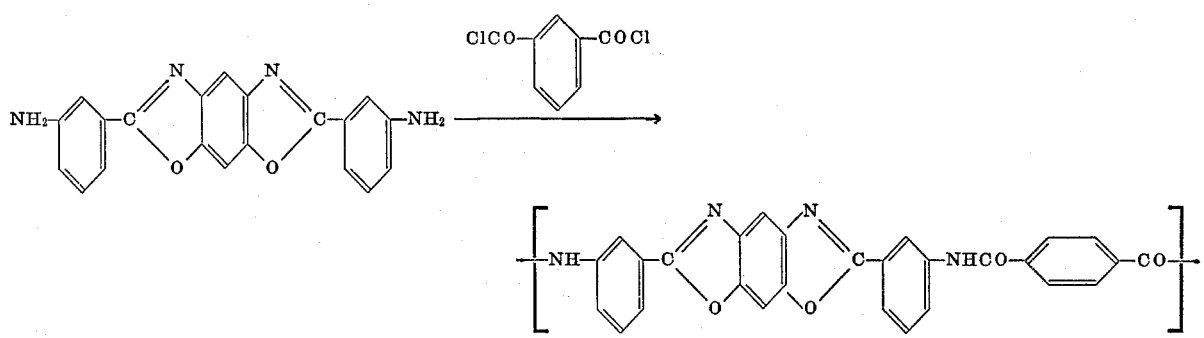

Diamine N was prepared as in previous examples by heating equivalent quantities of m-aminobenzoic acid and 5,6-diaminoresorcinol at 220° C. in PPA; the M.P. of pure N was 407–410° C. (dec.).

Polymerization of diamine N with isophthaloyl chloride was carried out on a 0.001 molar scale using the previously described techniques, good films were readily cast from solution.

EXAMPLE XVI

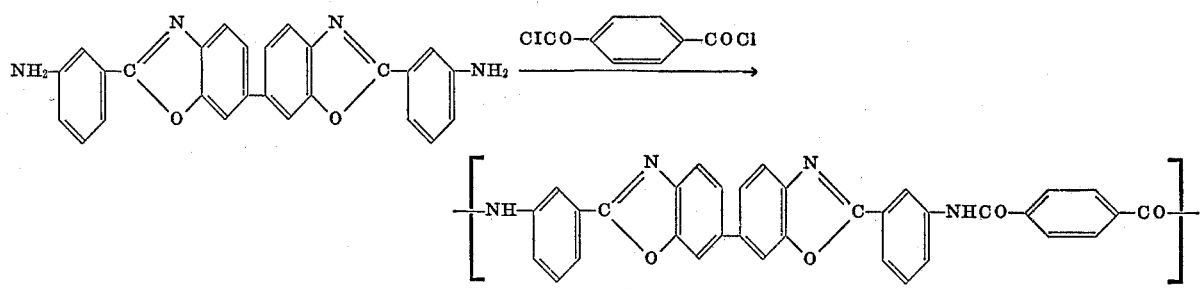

Diamine O was prepared by heating equivalent quantities of m-aminobenzoic acid and 3,3'-dihydroxybenzidine in PPA at 220° C.; the M.P. of pure O was 310–313° C.

Diamine O was polymerized with terephthaloyl chloride on a 0.001 molar scale using the techniques described above, a good film was cast from solution.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:
1. An amide-heterocyclic polymer consisting essentially of the regularly recurring structural units

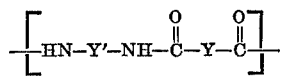

wherein Y and Y' are selected from the group consisting of Ar and Ar—X—Ar'—X—Ar wherein Ar is a multivalent hydrocarbon aromatic radical, Ar' is a multivalent hydrocarbon aromatic radical, and X is a 5 or 6 ring member heterocyclic radical containing 2 to 3 hetero ring elements selected from the group consisting of N, O, and S, and wherein at least one Ar—X—Ar'—X—Ar radical must be present in the recurring structural unit, all occurrences of X in the polymer must be the same, said polymer having at least one plane of symmetry in each recurring unit.

2. The amide-heterocyclic polymer of claim 1 wherein Y' is

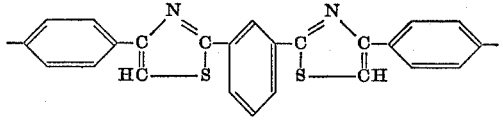

and Y is

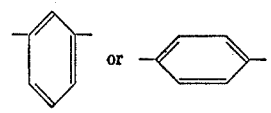

3. The amide-heterocyclic polymer of claim 1 wherein Y' is

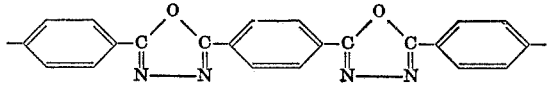

and Y is

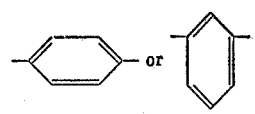

4. The amide-heterocyclic polymer of claim 1 wherein Y' is

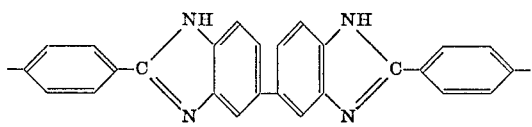

and Y is

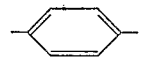

7. The polymer of claim 1 in the form of a fiber.
8. The polymer of claim 1 in the form of a self-supporting film.
9. A polyamide-hydrazide polymer consisting essentially of regularly recurring structural units of the formula

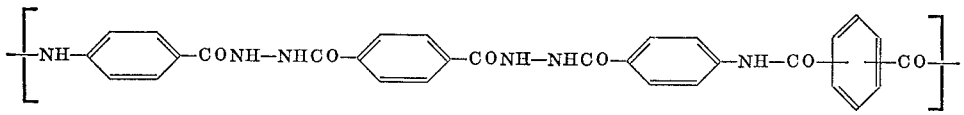

and Y is

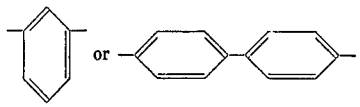

10. A polyamide-phenol polymer consisting essentially of regularly recurring structural units of the formula

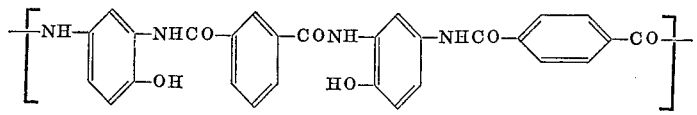

5. The amide-heterocyclic polymer of claim 1 wherein Y' is

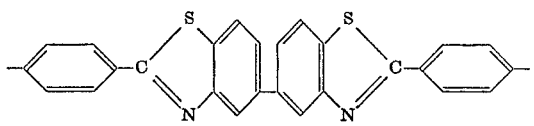

and Y is

6. The amide-heterocyclic polymer of claim 1 wherein Y' is

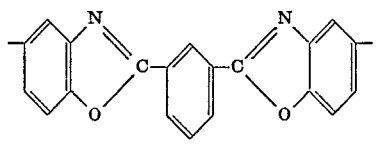

References Cited

UNITED STATES PATENTS

| | | | |
|---|---|---|---|
| 3,324,086 | 6/1967 | Preston | 260—78 |
| 3,330,811 | 7/1967 | Craven | 260—78 |
| 3,332,907 | 7/1967 | Angelo et al. | 260—78 |
| 3,130,182 | 4/1964 | Frazer | 260—78 |
| 3,238,183 | 3/1966 | Frazer | 260—78 |
| 3,316,213 | 4/1967 | Berr | 260—78 |
| 3,322,723 | 5/1967 | Angelo | 260—78 |

HAROLD D. ANDERSON, Primary Examiner

U.S. Cl. X.R.

117—161; 260—30.2, 32.6, 78, 302, 304, 307, 309.2, 558